(12) United States Patent
Cogley (10) Patent No.: US 11,678,653 B1
(45) Date of Patent: Jun. 20, 2023

(54) MOBILE INSECT KILLING SYSTEM WITH HANDLE ASSEMBLY

(71) Applicant: Thomas Paul Cogley, Pinellas Park, FL (US)

(72) Inventor: Thomas Paul Cogley, Pinellas Park, FL (US)

(*) Notice: Subject to any disclaimer, the term of this patent is extended or adjusted under 35 U.S.C. 154(b) by 0 days.

(21) Appl. No.: 16/747,428

(22) Filed: Jan. 20, 2020

Related U.S. Application Data

(60) Provisional application No. 62/794,581, filed on Jan. 19, 2019.

(51) Int. Cl.
*A01M 3/00* (2006.01)
(52) U.S. Cl.
CPC .................... *A01M 3/005* (2013.01)
(58) Field of Classification Search
CPC .......... A01M 3/005; A01M 5/04; A01M 5/08; A01M 2200/011
USPC ........................................................... 43/140
See application file for complete search history.

(56) References Cited

U.S. PATENT DOCUMENTS

| | | | | |
|---|---|---|---|---|
| 1,156,778 A | * | 10/1915 | Hesterly | A01M 5/08 43/140 |
| 1,849,180 A | * | 3/1932 | Driver | A01M 1/06 43/140 |
| 1,989,405 A | * | 1/1935 | Dillman | A01M 5/08 43/140 |
| 2,179,766 A | * | 11/1939 | Webb | A01M 5/08 43/140 |
| 2,517,292 A | * | 8/1950 | Dewey | A01M 5/08 43/140 |
| 2,530,893 A | * | 11/1950 | McElreath | A01M 5/08 43/140 |
| 2,608,023 A | * | 8/1952 | Dillon | A01M 15/00 43/140 |
| 2,643,482 A | * | 6/1953 | Wilson | A01M 5/08 43/140 |
| 4,843,752 A | * | 7/1989 | Munemasa | A01M 17/00 43/140 |
| 5,400,543 A | * | 3/1995 | Ideker, Jr. | A01M 1/06 134/21 |
| 5,974,728 A | * | 11/1999 | Nichols | A01M 1/06 43/140 |
| 6,286,249 B1 | * | 9/2001 | Miller | A01M 1/02 43/139 |
| 6,594,944 B2 | * | 7/2003 | Chura | A01M 1/10 43/112 |

(Continued)

FOREIGN PATENT DOCUMENTS

| | | | | |
|---|---|---|---|---|
| GB | 185394 A | * | 6/1923 | ............ A01M 5/08 |
| GB | 1361290 A | * | 7/1974 | ............ A01M 5/08 |
| KR | 101227451 B1 | * | 2/2013 | ............ A01M 5/04 |

*Primary Examiner* — Christopher P Ellis (57) ABSTRACT

A base assembly has an upward plate, a downward plate, a side wall, a front, a back, and laterally spaced sides. A drive assembly has drive wheels extending downwardly from the downward plate, a caster wheel, and proximity sensors. A vacuum assembly has a vacuum slit in the downward plate between the lateral sides and a vacuum-generating source capable of pulling a vacuum through the vacuum slit. A tower assembly is adapted to attract and kill insects while the base assembly and the tower assembly are being optionally driven by the drive assembly and the vacuum assembly is vacuuming up insects.

3 Claims, 7 Drawing Sheets

(56) References Cited

U.S. PATENT DOCUMENTS

| | | | | |
|---|---|---|---|---|
| 7,441,298 B2 * | 10/2008 | Svendsen | .............. | A47L 9/2894 15/49.1 |
| 10,021,871 B1 * | 7/2018 | Cogley | ................. | A01M 1/145 |
| 10,091,981 B1 * | 10/2018 | Cogley | ................... | A01M 1/103 |
| 10,729,122 B1 * | 8/2020 | Simon | ..................... | A01M 5/08 |
| 10,736,309 B1 * | 8/2020 | Cogley | ................. | A01M 1/223 |
| 2003/0060928 A1 * | 3/2003 | Abramson | ........... | G05D 1/0219 700/245 |
| 2003/0208951 A1 * | 11/2003 | Bossier | ................... | A01M 1/06 43/107 |
| 2004/0237382 A1 * | 12/2004 | Durand | ................... | A01M 5/00 43/139 |
| 2005/0066570 A1 * | 3/2005 | Mosher, II | ............. | A01M 1/06 43/139 |
| 2012/0137569 A1 * | 6/2012 | Younts | ................. | A01M 1/026 43/139 |
| 2014/0013655 A1 * | 1/2014 | Southard | ................ | A01M 1/22 43/139 |
| 2015/0264913 A1 * | 9/2015 | Ganmor | ................. | A01M 5/02 43/139 |
| 2019/0141981 A1 * | 5/2019 | Simon | ................... | A01M 1/103 43/111 |
| 2019/0223425 A1 * | 7/2019 | Tugel | ..................... | A01M 1/06 |
| 2020/0245607 A1 * | 8/2020 | Simon | ..................... | A01M 5/08 |

* cited by examiner

I AM SLEEPING RIGHT NOW

MOBILE INSECT KILLING SYSTEM WITH HANDLE ASSEMBLY

RELATED APPLICATION

This application is based upon Provisional Application No. 62/794,581 filed Jan. 19, 2019, the priority of which is claimed and the subject matter of which is incorporated herein by reference.

BACKGROUND OF THE INVENTION

Field of the Invention

The present invention relates to a mobile insect killing system and more particularly pertains to attracting insects, entrapping attracting insects, and killing entrapped insects while the system is moving from location to location. The attracting, entrapping, killing and moving are done in a safe, ecological, convenient, and economical manner.

Description of the Prior Art

The use of insect killing systems of known designs and configurations is known in the prior art. More specifically, insect killing systems of known designs and configurations previously devised and utilized for the purpose of attracting, entrapping and killing insects are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a mobile insect killing system that allows attracting insects, entrapping attracting insects, and killing entrapped insects while the system is moving from location to location. The attracting, entrapping, killing and moving are done in a safe, ecological, convenient, and economical manner In this respect, the mobile insect killing system according to the present invention substantially departs from the conventional concepts and designs of the prior art, and in doing so provides an apparatus primarily developed for the purpose of attracting insects, entrapping attracting insects, and killing entrapped insects while the system is moving from location to location. The attracting, entrapping, killing, and moving are done in a safe, and ecological, and convenient, and economical manner Therefore, it can be appreciated that there exists a continuing need for a mobile insect killing system which can be used for attracting insects, entrapping attracted insects, and killing entrapped insects while the system is moving from location to location. The attracting, entrapping, killing, and moving are done in a safe, ecological, convenient, and economical manner. In this regard, the present invention substantially fulfills this need.

SUMMARY OF THE INVENTION

In view of the foregoing disadvantages inherent in the known types of insect killing systems of known designs and configurations now present in the prior art, the present invention provides an improved insect killing system. As such, the general purpose of the present invention, which will be described subsequently in greater detail, is to provide a new and improved insect killing system and method which has all the advantages of the prior art and none of the disadvantages.

To attain this, the present invention essentially comprises a base assembly having an upward plate, a downward plate, a side wall, a front, a back, and laterally spaced sides. A drive assembly has drive wheels extending downwardly from the downward plate, a caster wheel, and proximity sensors. A vacuum assembly has a vacuum slit in the downward plate between the lateral sides and a vacuum-generating source capable of pulling a vacuum through the vacuum slit. A tower assembly is adapted to attract and kill insects while the base assembly and the tower assembly are being optionally driven by the drive assembly and the vacuum assembly is vacuuming up insects.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved insect killing system which is mobile and which has all of the advantages of the prior art insect killing systems of known designs and configurations and none of the disadvantages.

It is another object of the present invention to provide a new and improved insect killing system which is mobile and which may be easily and efficiently manufactured and marketed.

It is a further object of the present invention to provide a new and improved insect killing system which is mobile and which is of durable and reliable constructions.

An even further object of the present invention is to provide a new and improved insect killing system which is mobile and which is susceptible of a low cost of manufacture with regard to both materials and labor, and which accordingly is then susceptible of low prices of sale to the consuming public, thereby making such mobile insect killing system economically available to the buying public.

Lastly, it is an object of the present invention to provide a new and improved insect killing system which can be used for attracting insects, entrapping attracted insects, and killing entrapped insects while the system is moving from location to location. The attracting, entrapping, killing, and moving are done in a safe, ecological, convenient, and economical manner These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
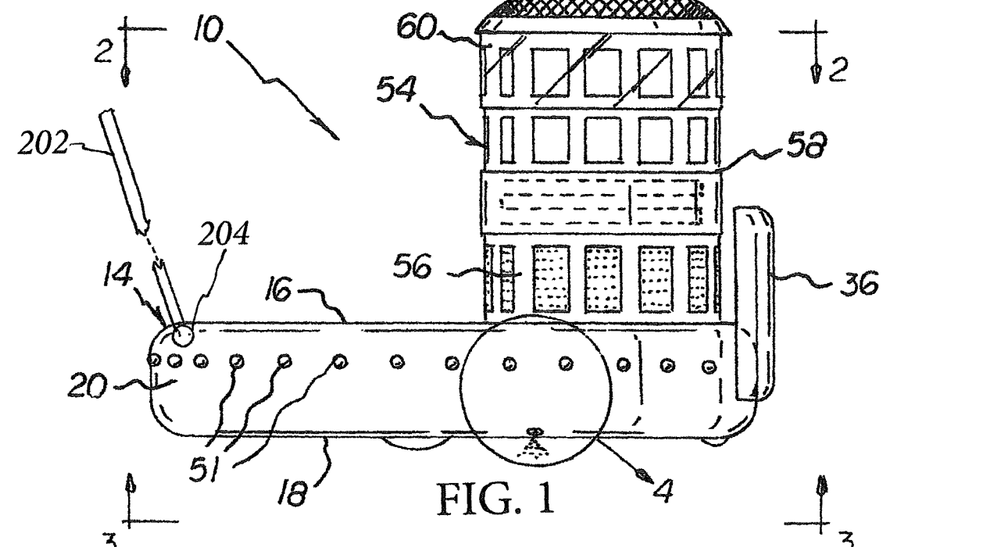
FIG. 1 is a side elevational view of a mobile insect killing system constructed in accordance with the principles of the present invention.

With reference now to the drawings, and in particular to FIG. 1 thereof, the preferred embodiment of the new mobile insect killing system embodying the principles and concepts of the present invention and generally designated by the reference numeral 10 will be described.

The present invention, the mobile insect killing system 10 is comprised of a plurality of components. Such components in their broadest context include a base assembly, a drive assembly, a vacuum assembly, and a tower assembly. Such components are individually configured and correlated with respect to each other so as to attain the desired objective.

The present invention is a mobile insect killing system 10 for attracting insects, entrapping attracted insects, and killing entrapped insects. Such is done while the system is moving from location to location. The attracting, entrapping, killing, and moving is done in a safe, ecological, convenient, and economical manner.

Figure 2:
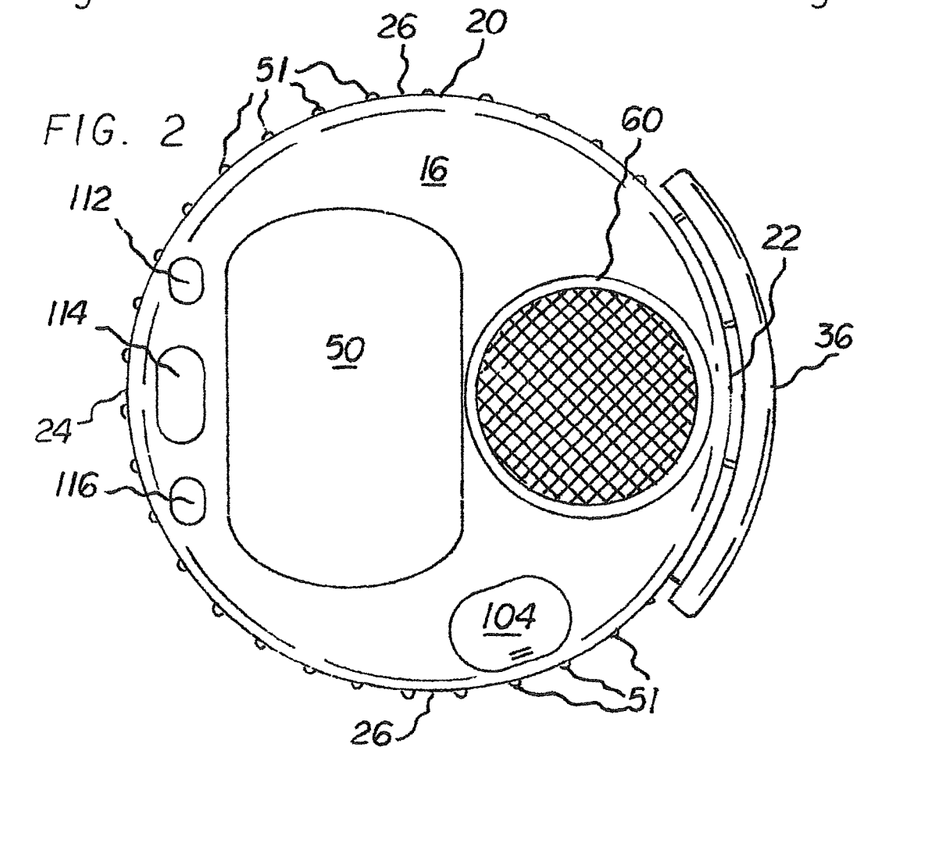
FIG. 2 is a plan view of the system taken along line 2-2 of FIG. 1.
Figure 3:
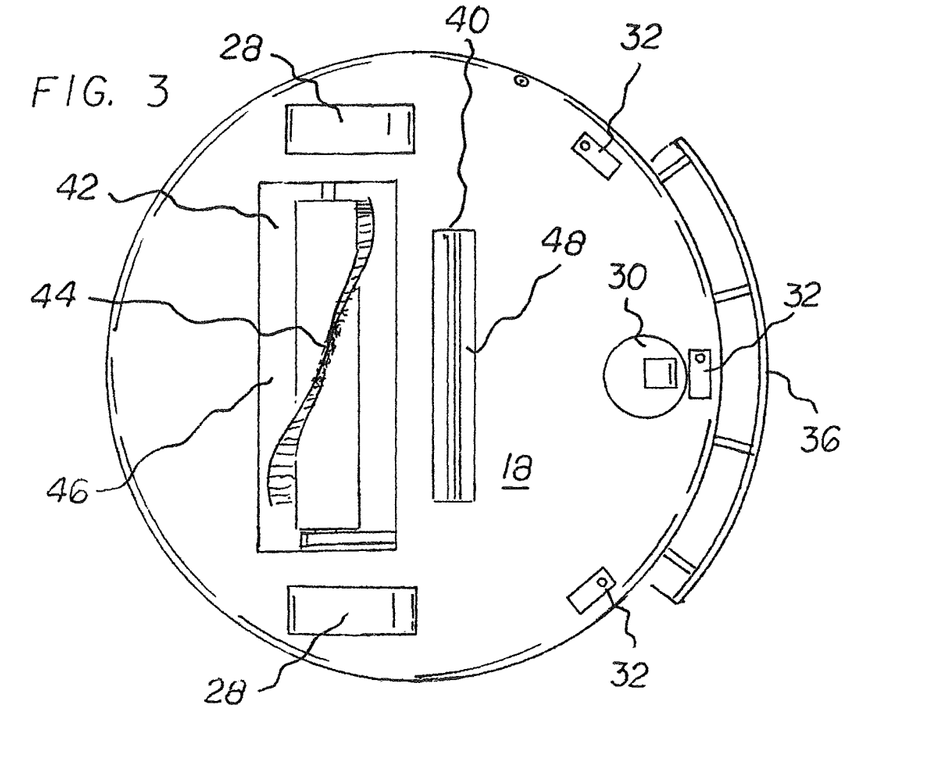
FIG. 3 is a bottom view of the system taken along line 3-3 of FIG. 1.

The system includes a base assembly 14. The base assembly includes an upward plate 16 having a circular configuration, a downward plate 18 having a circular configuration, and a side wall 20 having a cylindrical configuration. The base assembly has a diameter and a height. The upward plate, downward plate, and side wall have a vertical central axis. The base assembly forms a lower housing within the upward plate, downward plate, and side wall. The base assembly has a front 22, a back 24, and laterally spaced sides 26.

Next provided is a drive assembly. The drive assembly has two drive wheels 28 and a caster wheel 30. The two drive wheels are located adjacent to the laterally spaced sides of the base assembly and extend downwardly from the downward plate. The drive assembly also includes three proximity sensors 32 coupled to the downward plate and located adjacent to the front of the base assembly and between the front and the laterally spaced sides.

A shield 36 is provided. The shield is in an arcuate configuration concentric with the side wall and extending radially outwardly from the base assembly. The shield extends between 25 and 35 degrees from the front of the base assembly. The shield has an upper edge at an elevation above the base assembly between 80 percent and 120 percent of the height of the base assembly to thereby abate the base assembly from being wedged beneath furniture during operation and use.

A vacuum assembly is next provided. The vacuum assembly includes a vacuum slit 40 formed in the downward plate between the laterally spaced sides. The vacuum slit has a first width and a first length. The vacuum assembly also has a brushing slot 42 formed in the downward plate between the laterally spaced sides. The vacuum slit has a second width and a second length. The second width and the second length are greater than the first width and the first length. A brush 44 in a cylindrical configuration with outwardly extending spiral bristles is positioned in the vacuum slit and is adapted to extend beneath the downward plate. A first source of vacuum 46 functions to pull a vacuum through the vacuum slit. A second source of vacuum 48 functions to pull a vacuum through the brushing slot. A door 50 is formed in the upper plate to facilitate removal of debris received from the vacuum slit and the brushing slot. A plurality of peripheral light emitting diodes 51 are positioned on the side wall of the base assembly for attracting insects. The vacuum assembly is provided with two inspection doors 57.

An optional feature is the provision of an optical sensor to recognize that the system is approaching stairs. The optical sensor will redirect the motion of the system away from the stairs for safety purposes. An associated safety feature is a handheld remote to guide the movement of the system.

Figure 5:
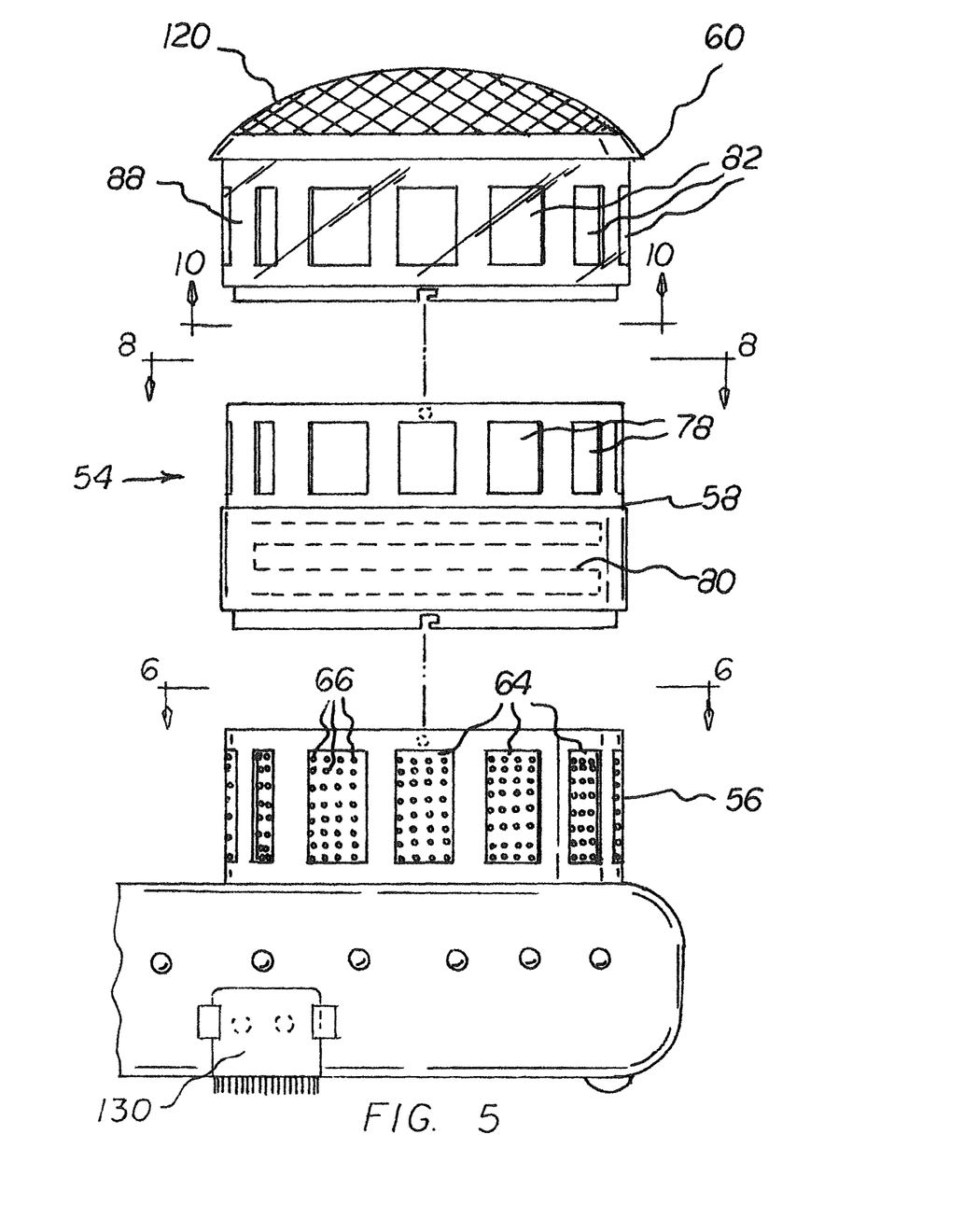
FIG. 5 is an exploded view of the tower shown in FIGS. 1 and 2.

Projecting upwardly from the base assembly is a tower assembly 54. The tower assembly is formed of a lower section 56, an intermediate section 58, and an upper section 60. The tower assembly has a diameter between 40 percent and 50 percent of the diameter of the base assembly.

Figure 6:
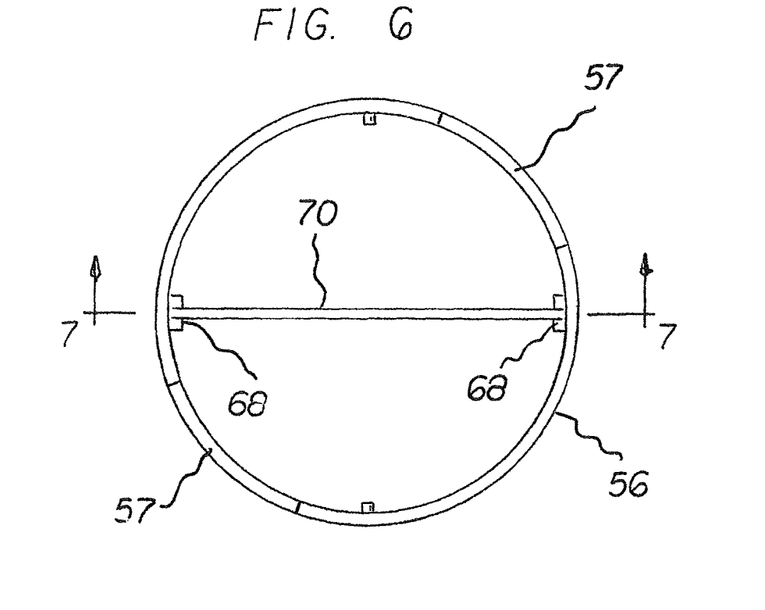
FIG. 6 is a plan view of the lower section of the tower taken along line 6-6 of FIG. 5.
Figure 7:
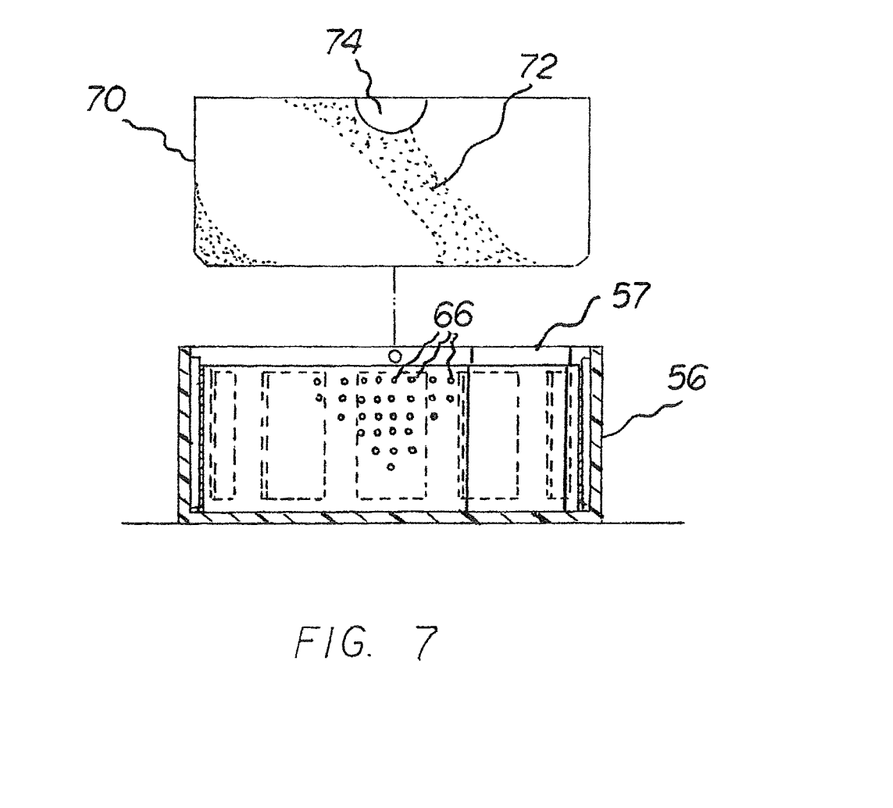
FIG. 7 is an exploded cross sectional view taken along line 7-7 of FIG. 6.

The lower section of the tower assembly is formed with a plurality of lower panels 64 with small apertures 66 in rows and columns to allow passage of insects. Vertically oriented recesses 68 are provided. A card 70 with an adhesive section 72 and a non-adhesive tab 74 is removably positioned in the vertically oriented recesses. The non-adhesive tab is of the type attached to a security seal of a container thus providing cleanliness to the touch. The card functions in the receipt, entrapment, and death of insects passing through the small apertures.

Figure 8:
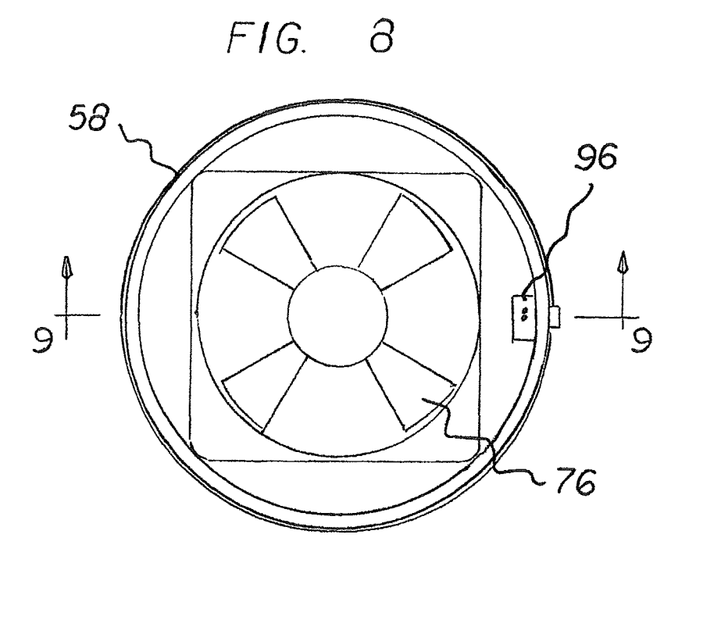
FIG. 8 is a plan view of the intermediate section of the tower taken along line 8-8 of FIG. 5.
Figure 9:
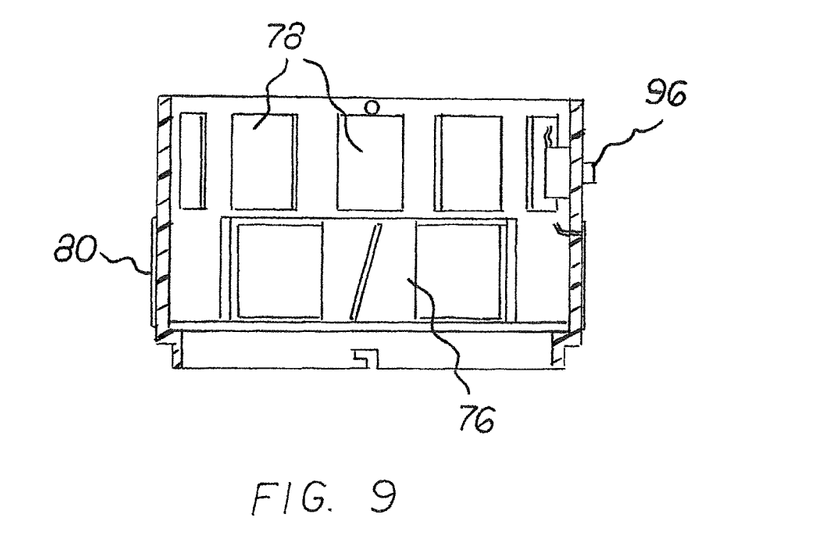
FIG. 9 is a cross sectional view taken along line 9-9 of FIG. 8.

The intermediate section has a fan 76 rotatable about a vertical axis and a plurality of rectangular passageways 78. A heater strip 80 encompasses the intermediate section for attracting insects whereby the attracted insects will be entrapped by the card. A button 96 and associated controller are provided for activating and inactivating the fan. The controller also includes a voice card to generate a verbal greeting upon pressing the button to start the fan and the system. The verbal greeting is variable at the discretion of a user. The controller is also programmable to initiate activation and termination at appropriate days and times, preferably during sleep time.

Figure 10:
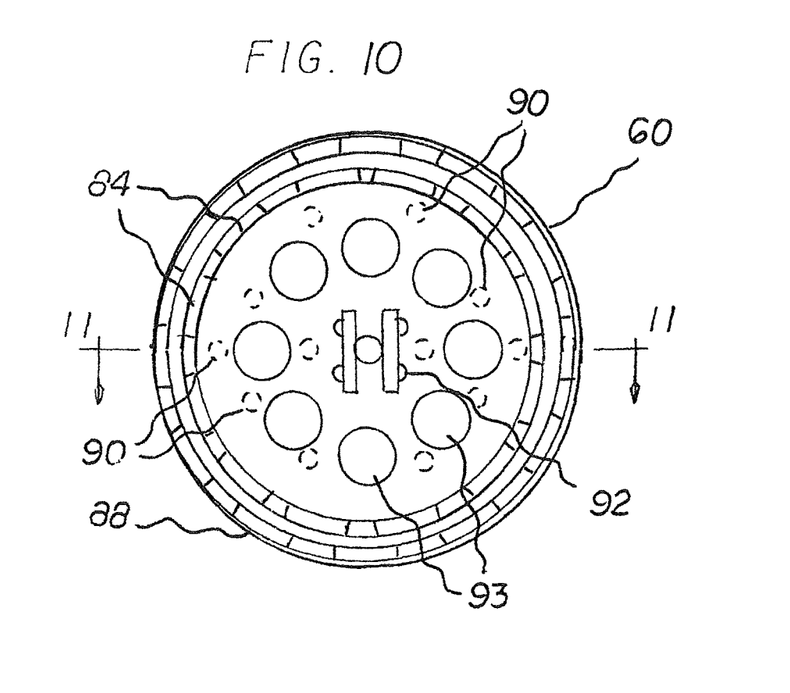
FIG. 10 is a bottom view of the upper section of the tower taken along line 10-10 of FIG. 5.
Figure 11:
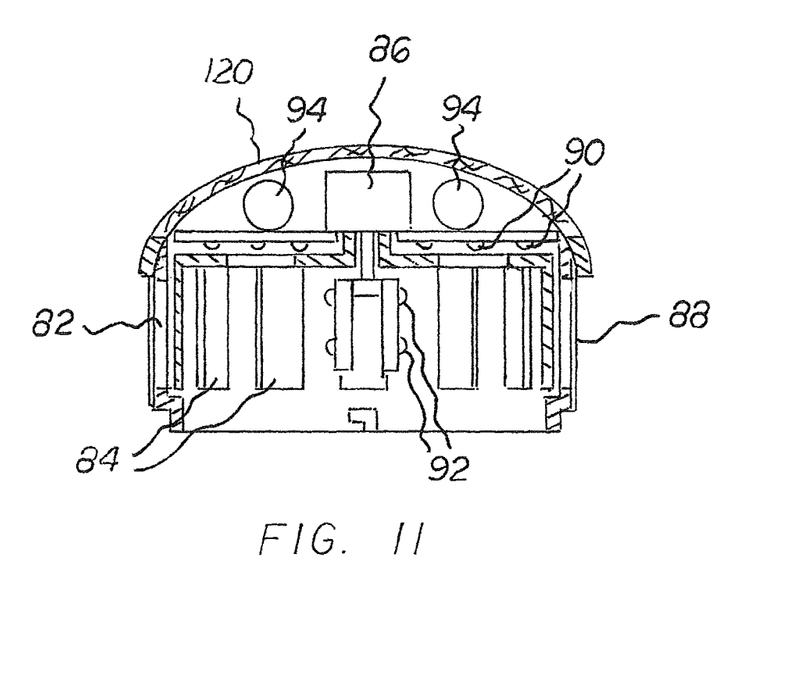
FIG. 11 is a cross sectional view taken along line 11-11 of FIG. 10.

The upper section of the tower assembly has a circumferential opaque surface with spaced openings 82. A plurality of fingers 84 are coated with titanium dioxide. A motor 86 is provided to rotate the fingers. A flexible strip 88 of transparent adhesive covers the spaced openings to entrap insects. A plurality of upper light emitting diodes 90 and a plurality of rotating light emitting diodes 92 are provided. Batteries 94 are provided for energizing a motor to rotate the fingers. The rotating light emitting diodes 92 are adapted to produce carbon dioxide when shining light upon the titanium dioxide of the fingers. Openings 93 are adapted to allow the produced carbon dioxide to enter the intermediate and lower sections of the tower assembly. The fingers are adapted to block light from the light emitting diodes 92 alternately as the fingers move there past causing an alternating function.

The system further includes a dispenser assembly which has a container 102. The container has a door 104 in the upper plate for depositing diatomaceous earth into the container. A dispensing port 106 includes a valve 108 for dropping the diatomaceous earth from the container to a surface to be vacuumed. A rotatable vibrator 110 functions to facilitate the dispensing of the diatomaceous earth.

Controls are provided in the upper surface for energizing the vacuum on/off 112, for lid release 114, and for mop on/off 116.

Next provided is a fabric top 120. The fabric top has a dome shaped configuration. The fabric top is impregnated with diatomaceous earth.

Figure 4:
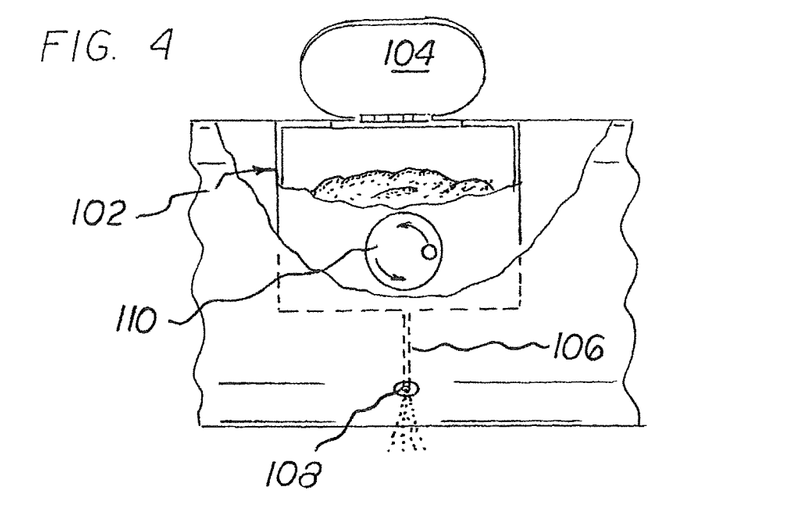
FIG. 4 is an enlarged showing of a portion of the system taken at circle 4 of FIG. 1.

An electric comb 130 is removably secured to the side of the base assembly. Laterally spaced clips provide proper positioning during use with the tips of the comb beneath the lower surface of the base assembly. Electrical contacts on the comb and on the base assembly power the comb from the base assembly during use of the system.

Figure 12:
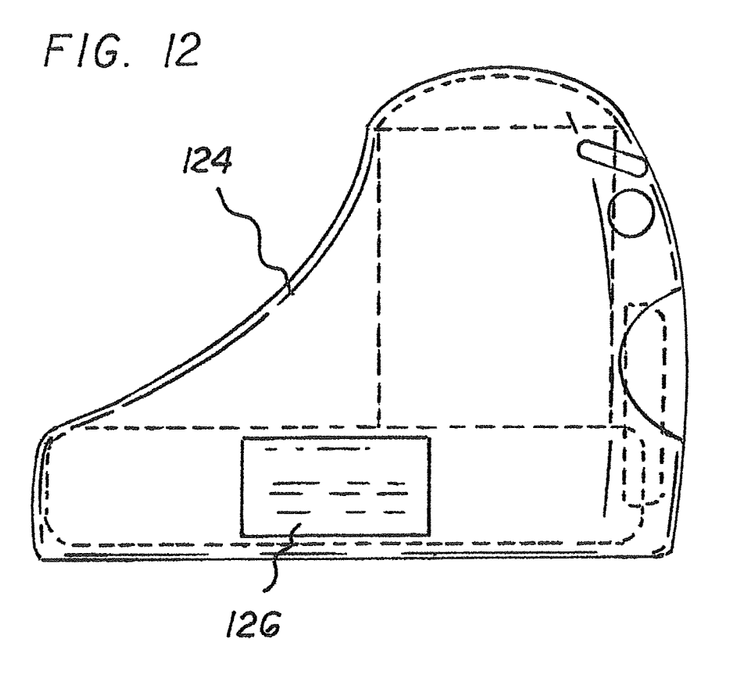
FIG. 12 is a side elevational view of the system with a covering shroud.
Figure 13:
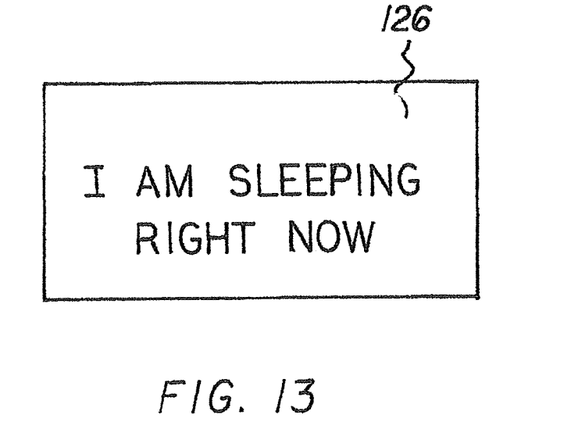
FIG. 13 is a side elevational view of the name plate of the present invention.

Next provided is a shroud 124 fabricated of a flexible material covering the base assembly and the tower assembly when not in use. The shroud has an open bottom for removable positioning on the the base assembly and the tower assembly. The shroud has artistic indicia to create an appearance of an animal. The shroud has a nameplate 126 with alpha-numeric indicia to effectively introduce the system to a user.

Next, a handle assembly 202 is provided. The handle assembly has a lower end removably coupled to the base assembly diametrically opposite from the caster. The handle assembly has an upper end adapted to be held by a user for guiding the movement of the base assembly over the surface upon which it is supported.

Lastly, a control assembly 204 is provided. The control assembly couples the lower end of the handle assembly with the drive assembly. In this manner, the system itself guides the movement of the base when the handle assembly is removed from the base assembly, and movement of the base assembly is guided by the user through the handle assembly when the handle assembly is coupled to the base assembly.

Various optional features are adapted to be integrated into the system of the present invention. Consider, for example, a name plate on the base assembly, different colors on the various components of the system, a spray head extending upwardly from the base assembly for intermittent disseminating Insect Growth Regulator, an insect killing coating on the fabric of the shroud, etc.

From the above descriptions, it can be appreciated that the present invention includes 21 features functioning for the killing of insects:
　1. Motion;
　2. Silhouette;
　3. Heat;
　4. Carbon dioxide production light;
　5. Insect entrance portals with no exit;
　6. Sticky surfaces;
　7. Conventional light as an insect attractant;
　8. Fan to blow the carbon dioxide;
　9. Flickering light;
　10. Fur on top to kill with diatomaceous earth;
　11. Movable sticky surfaces;
　12. Electric comb;
　13. Larvae/eggs suction;
　14. Brush up for larvae/eggs.
　15. Intermittent spray for Insect Growth Regulator;
　16. Spreading;
　17. Hovering sticky surfaces capture flying insects;
　18. Voice coaxing;
　19. Identification plates;
　20. Ankle height/pet height.
　21. Port for diatomaceous earth.
　22. Night time illumination.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:
　1. A mobile insect killing system comprising:
　　a base assembly comprising: an upward plate and a downward plate and a side wall, and a front and a back and laterally spaced sides;
　　a drive assembly comprising: drive wheels extending downwardly from the downward plate, a caster wheel, and proximity sensors;
　　a vacuum assembly comprising: a vacuum slit in the downward plate between the lateral sides, and a vacuum-generating source capable of pulling a vacuum through the vacuum slit;

a tower assembly adapted to attract and kill insects while the base assembly and the tower assembly are being optionally driven by the drive assembly and the vacuum assembly is vacuuming up insects; and a handle assembly having a lower end removably coupled to the base assembly diametrically opposite from the castor, the handle assembly having an upper end adapted to be held by a user for guiding the movement of the base assembly over the surface upon which it is supported.

2. The system as set forth in claim 1 and further including:

a control assembly coupling the lower end of the handle assembly with the drive assembly whereby the system itself guides the movement of the base when the handle assembly is removed from the base assembly, and whereby movement of the base assembly is guided by the user through the handle assembly when the handle assembly is coupled to the base assembly.

3. A mobile insect killing system comprising:

a base assembly comprising: an upward plate and a downward plate and a side wall, and a front and a back and laterally spaced sides;

a drive assembly comprising: drive wheels extending downwardly from the downward plate, a caster wheel, proximity sensors;

a vacuum assembly comprising: a vacuum slit in the downward plate between the lateral sides, and a vacuum-generating source capable of pulling a vacuum through the vacuum slit;

a tower assembly adapted to attract and kill insects while the base assembly and the tower assembly are being driven by the drive assembly and the vacuum assembly is vacuuming up insects, the tower assembly comprising:

a lower section comprising: a plurality of lower panels with small apertures in rows and columns to allow passage of insects into the tower assembly, vertically oriented recesses, a card with an adhesive section and a non-adhesive section to facilitate removal and replacement of the card after receipt, entrapment, and death of insects passing through the small apertures;

and an intermediate section comprising: a fan rotatable about a vertical axis and a plurality of rectangular passageways, a heater strip encompassing the intermediate section adapted to attract insects whereby the attracted insects will be entrapped by the card, and a button and associated controller comprising a voice card to generate a verbal greeting upon pressing the button to start the fan and the system, the verbal greeting being variable at the discretion of a user, the controller further being programmable to initiate activation and termination at appropriate days and times;

and an upper section comprising: a circumferential opaque surface with spaced openings, a plurality of fingers coated with titanium dioxide, a motor to rotate the fingers, a flexible strip of transparent adhesive covering the spaced openings to entrap insects, a plurality of upper light emitting diodes, a plurality of rotating light emitting diodes, batteries for energizing the upper motor to rotate the plurality of fingers, rotating light emitting diodes adapted to produce carbon dioxide when shining light upon the titanium dioxide of the plurality of fingers, and supplemental openings adapted to allow the produced carbon dioxide to enter the intermediate and lower sections of the tower assembly;

the plurality of fingers, adapted to block light from the light emitting diodes alternately as the plurality of fingers, move there past causing an alternating function;

a handle assembly having a lower end removably coupled to the base assembly diametrically opposite from the castor, the handle assembly having an upper end adapted to be held by a user for guiding the movement of the base assembly over the surface upon which it is supported; and a control assembly coupling the lower end of the handle assembly with the drive assembly whereby the system itself guides the movement of the base when the handle assembly is removed from the base assembly, and whereby movement of the base assembly is guided by the user through the handle assembly when the handle assembly is coupled to the base assembly.

* * * * *